United States Patent
Plummer et al.

(10) Patent No.: US 12,385,188 B2
(45) Date of Patent: Aug. 12, 2025

(54) FIRE RETARDANT PAPER

(71) Applicant: Thermal Ceramics, Inc., Augusta, GA (US)

(72) Inventors: Jensen Plummer, Augusta, GA (US); Gary Gayman, Augusta, GA (US)

(73) Assignee: Thermal Ceramics, Inc., Augusta, GA (US)

( * ) Notice: Subject to any disclaimer, the term of this patent is extended or adjusted under 35 U.S.C. 154(b) by 175 days.

(21) Appl. No.: 17/921,195

(22) PCT Filed: Apr. 13, 2021

(86) PCT No.: PCT/GB2021/050890
§ 371 (c)(1),
(2) Date: Oct. 25, 2022

(87) PCT Pub. No.: WO2021/219976
PCT Pub. Date: Nov. 4, 2021

(65) Prior Publication Data
US 2023/0167610 A1    Jun. 1, 2023

Related U.S. Application Data

(60) Provisional application No. 63/015,892, filed on Apr. 27, 2020.

(30) Foreign Application Priority Data

May 14, 2020   (GB) ...................................... 2007151

(51) Int. Cl.
*D21H 21/34*    (2006.01)
*D21H 13/36*    (2006.01)
(Continued)

(52) U.S. Cl.
CPC ........... *D21H 21/34* (2013.01); *D21H 5/0002* (2013.01); *D21H 13/36* (2013.01); *D21H 13/38* (2013.01);
(Continued)

(58) Field of Classification Search
CPC ........ D21H 21/34; D21H 13/40; D21H 17/36; D21H 17/37; D21H 17/675; D21H 17/68; D21H 17/74
(Continued)

(56) References Cited

U.S. PATENT DOCUMENTS 4,963,603 A    10/1990   Felegi et al.
7,767,597 B2    8/2010   Garvey
(Continued)

FOREIGN PATENT DOCUMENTS

CN    108666510 A    10/2018
EP    0132936 A1    2/1985
(Continued)

OTHER PUBLICATIONS

Siemons et al., Dextrose equivalence of maltodextrins determines particle morphology development during single sessile droplet drying , Jan. 2020, Food Research International, 131. (Year: 2020).*
Chemsec, Aluminum hydroxide—flame retardant, downloaded online on Jul. 12, 2024. (Year: 2024).*
BTI, Rock Wool Properties, Aug. 1, 2018 [downloaded online Oct. 24, 2024 from https://btisolatsioon.ee/en/ ] (Year: 2018).*
(Continued)

*Primary Examiner* — Anthony Calandra
(74) *Attorney, Agent, or Firm* — SERVILLA WHITNEY LLC (57) ABSTRACT

The invention relates to a fire retardant paper comprising reinforcing fibre, a fire retardant material and a binder system, wherein the binder system comprises a first organic binder and a second organic binder, wherein the first organic binder has a lower glass transition temperature than the second organic binder.

19 Claims, 2 Drawing Sheets

(51) Int. Cl.
*D21H 13/38* (2006.01)
*D21H 13/40* (2006.01)
*D21H 17/00* (2006.01)
*D21H 17/36* (2006.01)
*D21H 17/37* (2006.01)
*D21H 17/67* (2006.01)
*D21H 17/68* (2006.01)
*H01M 50/383* (2021.01)

(52) U.S. Cl.
CPC ............ *D21H 13/40* (2013.01); *D21H 17/00* (2013.01); *D21H 17/36* (2013.01); *D21H 17/37* (2013.01); *D21H 17/675* (2013.01); *D21H 17/68* (2013.01); *D21H 17/74* (2013.01); *H01M 50/383* (2021.01)

(58) Field of Classification Search
USPC ...................... 162/114, 5, 152, 153, 156, 155
See application file for complete search history.

(56) References Cited

U.S. PATENT DOCUMENTS 8,568,563 B1 * 10/2013 Bennett .................. D21H 17/51
  162/149
2021/0207301 A1 * 7/2021 Wu ....................... D04H 1/4218

FOREIGN PATENT DOCUMENTS

| EP | 0227853 A1 * | 7/1987 | ............... D21H 5/00 |
| EP | 3142166 A1 | 3/2017 | |
| EP | 3269540 A1 | 1/2018 | |
| WO | 2017065896 A1 | 4/2017 | |

OTHER PUBLICATIONS

PCT International Search Report and Written Opinion in PCT/GB2021/050890 dated Jun. 18, 2021, 9 pages.
Balog, et al., "Evaluation of Limestone With Non-Invasive Analytical Methods", Rom. Journ. Phys., vol. 59, Nos. 5-6, p. 601-607, Bucharest, 2014.

* cited by examiner

FIRE RETARDANT PAPER

CROSS-REFERENCE TO RELATED APPLICATIONS

This application is the National Stage entry of PCT/GB2021/050890, filed on Apr. 13, 2021, which claims priority to U.S. Appln. Ser. No. 63/015,892, filed on Apr. 27, 2020, and United Kingdom Ser. No. 2007151.0, filed on May 14, 2020 which are incorporated herein by reference in their entireties.

FIELD OF THE INVENTION

The present disclosure relates to fire retardant paper for use in energy storage devices; said energy storage devices and laminates and other layered arrangements comprising the fire retardant paper. In particular, the present invention relates to fire retardant paper for use between pouch and prismatic cell batteries.

BACKGROUND

The pouch cell makes the most efficient use of space and achieves a 90 to 95 percent packaging efficiency, the highest among battery packs. Eliminating the metal enclosure reduces weight but the cell needs some alternative support in the battery compartment. The pouch pack finds applications in consumer, military, as well as automotive applications. No standardized pouch cells exist; each manufacturer builds the cells for a specific application.

Pouch packs are normally Li-polymer. The energy density can be lower and be less durable than Li-ion in the cylindrical package. Swelling as a result of gas generation during charge and discharge is a concern. Up to 10% swelling may occur during normal operation, with up to 30% swelling possible when the cells are approaching end of life operation.

Battery research indicates that optimal battery lifespan occurs when a moderate amount of pressure is applied to ensure electrical and thermal connections while the battery 'breathes' during its discharge and recharge cycles. Traditionally, cells are separated by polymeric foam (e.g. polyurethane based foams) to provide constant compression of the cells to maintain their position securely in the housing. However, the polymeric foams provide no fire retardant properties and instead have a propensity to accelerate thermal runaway events.

CN108028334 addressed this problem through incorporating a flame retardant material into the module housing with the flame retardant material being automatically discharged upon swelling of the cell. WO2014182102 discloses the use of a fire retardant resin, located within a double pouch, which has a melting temperature of 80° C. or higher.

Whilst these solutions address the problem of thermal runaway through protecting adjacent cells, the solutions are heavy and/or complex and, as such, there is scope for further improvement to pouch cell safety mechanisms.

SUMMARY OF THE INVENTION

In a first aspect of the present disclosure, there is provided a fire retardant paper comprising reinforcing fibre, a fire retardant material and a binder system, wherein the binder system comprises a first organic binder and a second organic binder, wherein the first organic binder has a lower glass transition temperature than the second organic binder.

In some embodiments, the first organic binder has a glass transition temperature less than 45° C. or less than 30° C. or less than 20° C. or less than 15° C. or less than 12° C. or less than 10° C. or less than 5° C. In general, lower glass transition temperatures of the first organic binder favours more flexible fire retardant paper.

In some embodiments, the second organic binder has a glass transition temperature greater than 20° C. or greater than 30° C. or greater than 40° C. or greater than 60° C. or greater than 80° C. or greater than 100° C. In general, higher glass transition temperatures of the second organic binder favours more compressive resistant fire retardant paper.

In one embodiment, the first organic binder has a glass transition temperature in the range of −20° C. to 45° C. and the second organic binder has a glass transition temperature in the range of 20° C. to 100° C.

In some embodiments, the difference between the glass transition in the second and first organic binders is greater than 10° C. or greater than 15° C. or greater than 20° C. or greater than 30° C. or greater than 40° C. A greater difference in the glass transition temperatures of the organic binders enables a combination of soft binder with good flexibility to be matched with hard binders with good mechanical properties.

In one embodiment, the fire retardant paper has a sufficient flexibility to have a flexibility value of less than 152 mm and a 20% compression value of at least 0.09 Mpa and a 60% compression value of at least 0.9 MPa. In some embodiments, the 60% compression value is between 0.9 MPa and 5.0 MPa or between 0.1 MPa and 3.0 MPa. In some embodiments, the flexibility value is in the range 21.5 to 152 mm or between 26.7 mm to 88.9 mm or between 33.3 mm to 60.4 mm. By varying the ratio and type of organic binder, fire retardant paper may be developed with the required flexibility and compressive resistance for a range of end-use purposes.

The reinforcing fibre may comprise inorganic fibre and/or organic fibre. The inorganic fibres may be refractory fibres.

The binder system may comprise an inorganic binder.

In one embodiment, the fire retardant paper comprises:
A. 20 to 65 wt % (or 70 wt %) and preferably 25 wt % to 60 wt % refractory fibre;
B. 0 to 30 wt % and preferably 2.0 wt % to 15 wt % organic fibre;
C. 5 to 65 wt % and preferably 10 wt % (or 20 wt % or 30 wt %) to 60 wt % fire retardant material;
D. 3.0 to 30 wt % (or 20 wt %) and preferably 5.0 wt % to 15 wt % organic binder; and
E. 0 to 4 wt % and preferably >0 to 2.0 wt % inorganic binder wherein A+B+C+D+E>80 wt % of the total weight of the fire retardant paper.

A+B+C+D+E may be greater than 90 wt % or greater than 95 wt % of the total weight of the fire retardant paper.

The organic binder may be part of the binder system. In particular, the organic binder may comprise the first organic binder and/or the second organic binder.

The fire retardant paper may form part of an energy storage device.

The energy storage device preferably comprises a plurality of cells, e.g. pouch or prismatic cells. The fire retardant paper may be used as spacers between and/or around cells. However, it will be recognized that the paper of the present disclosure could be used in a variety of energy storage device applications.

The energy storage device comprises a fire retardant paper which may be able to meet the stringent requirements of:

compressible (supporting dimensional changes of the cell);

sufficiently tough and flexible to withstand large scale manufacturing techniques;

maintain shape when exposed to high temperatures;

provide both a mechanical and insulation barrier between neighbouring cells; and/or light and relatively thin.

A key factor in being able to achieve the required functionality is the use of at least two organic binders. While not wanting to be bound by theory it is thought that the combination of a soft binder (first organic binder) combined with a hard organic binder (second organic binder) is able to at least partially substitute the inorganic binder and thereby maintain a paper with good compressive strength whilst having the required flexibility.

Organic Binders

The choice and amount of organic binders are important in balancing the compressive strength characteristics of the paper with the paper's flexibility. The former properties enables the paper to provide sufficient mechanical strength of the paper to protect neighboring cells from swelling or ruptured cells under thermal runaway. The latter properties enables the paper to be manufactured and applied without cracking as well as maintaining its integrity (e.g. maintaining a heat, flame and gas barrier) while flexing to the distortions of swelling pouch cells.

The first organic binder is preferably a softer, more flexible binder than the second organic binder. This is reflected in the first organic binder preferably having a lower glass transition temperature than the second organic binder. The glass transition temperature of the organic binder is preferably at least 5° C. or at least 10° C. or at least 15° C. or at least 20° C. lower than the second organic binder.

In one embodiment, the first organic binder has a glass transition temperature of at least 20° C. or more.

In one embodiment, the first organic binder has a glass transition temperature in the range of −100° C. to 45° C. In one embodiment, the second organic binder has a glass transition temperature in the range of 20° C. to 200° C.

In one embodiment, the first organic binder has a glass transition temperature in the range of −10° C. (or −40° C.) to 30° C. and the second organic binder has a glass transition temperature in the range of 20° C. to 100° C. or 25° C. to 60° C. In some embodiments, the first organic binder has a glass transition temperature in the range of −20° C. to 12° C. and the second organic binder has a glass transition temperature in the range of 30° C. to 80° C. In one embodiment, the first organic binder has a glass transition temperature in the range of −20° C. to 30° C. and the second organic binder has a glass transition temperature in the range of 20° C. to 50° C.

The weight ratio of the first organic binder to the second organic binder is preferably in the range of 0.5:1 to 20:1, or 0.8:1 to 15:1, or 1:1 to 10:1, or 2:1 to 5:1. Preferably, the proportion of the first organic binder is greater than the second organic binder. While not wanting to be bound by theory it is thought that the first organic binder is able to form a continuous binder phase which has good flexibility, while a disperse second organic binder is able to contribute to increased compressive resistance.

In some embodiments, the weight mean glass transition temperature of the binder system is less than 30° C. or less than 25° C. or less than 20° C. or less than 15° C. or less than 12° C. or less than 10° C.

The first and/or second organic binder may be a reactive binder (i.e. a binder that cross links upon exposure to an activation source, such as heat or UV light). Cross linking of the first (i.e. soft) binder is thought to have the largest impact to the flexibility to the resultant paper, when the binder is activated. Heat reactive binders tend to cross link upon being raised to a predetermined temperature for a predetermined amount of time. In one embodiment, the organic binders are at least partially cross-linked in the formation of the fire retardant paper.

In one embodiment, the organic binder further comprises a thermosetting or reactive binder. The amount of reactive binder is typically between 0 and 10 wt % (or 30 wt %) of the total amount of organic binder and preferably between 2 wt % and 8 wt % of the total amount of organic binder. In one embodiment, the paper further comprises between 0.5 to 5 wt % of a reactive binder relative to the total weight of the organic binder. The reactive binder adds further crosslinking to the organic binder system, when cured, thereby increasing the mechanical strength (e.g. rupture strength) of the paper.

Binders, such as acrylic latex, may be modified by addition of melamine formaldehyde to enhance cross-linking which adds stiffness and heat resistance.

As the increased strength is required when the paper is exposed to elevated temperatures, the thermosetting binder preferably has a curing temperature within 20° C. of the activation temperature of an endothermic material, in embodiments in which the fire retardant material comprises an endothermic material.

In another embodiment, the first and second organic binders are reactive binders which are only partially reacted during the manufacturing of the fire retardant paper. As such, upon exposure of the fire retardant paper to heat above the curing temperature of the binders (or other activation source), cross linking of the binders occurs thereby increasing the mechanical strength of the paper. By increasing the mechanical strength of the material only when it is required, then a reduction in flexibility of the paper is only experienced during a thermal runaway event. In these circumstances, an increase in mechanical strength of the fire retardant paper can assist in adverting the impact of the thermal runaway event.

To enable the mechanical properties of the paper to change at a sufficient fast rate to strengthen the fire retardant paper, the organic binder may comprises a curing catalyst. Catalysts such as maleic acid, phosphoric acid, diammonium hydrogen phosphonate, and latent acid catalyst can be used to speed up the rate of the crosslinking reaction.

The binder may be a thermoplastic, thermosetting or elastomeric binder. The binders may form part of a solution, dispersion or emulsion, which is preferably aqueous. The solids content is typically between 30 wt % and 70 wt %.

Suitable binders can include various polymers and elastomers in latex form, for example, natural rubber latex, acrylic latexes, styrene acrylics and acrylonitrile acrylics, styrene-butadiene latices, butadiene acrylonitrile latices, and latices of acrylate and methacrylate polymers and copolymers (e.g., polymethyl acrylate, polyethyl acrylate, and polymethyl methacrylate, copolymer of acrylic esters and styrene), melamine resins, cross-linked vinyl chloride acrylate copolymers, vinyls such as poly vinyl alcohol (PVA), poly ethylene vinyl alcohol (PEVOH), poly vinyl acetate, poly vinyl ether, poly vinyl chloride (PVC), poly vinyl ester, butadienes such as poly styrene butadiene, polybutadiene acrylonitrile, polyesters, co-polyesters, polyamides, co-polyamides, cross-linked polyesters, epoxies, phenoxies, phenolics, polyurethanes, phenol-formaldehyde or urea-formaldehyde resins, combinations and copolymers thereof.

It is preferred to use halogen-free polymers to avoid decomposition and release of noxious and corrosive halogen gases during a fire. Acrylic polymers are preferred because of their excellent heat resistance, aging properties, and noncorrosive combustion products.

Refractory Fibre

The inorganic fibres used in the protective material of this disclosure are refractory materials which combine high strength, good thermal resistance and the ability to retain relatively high levels of high density endothermic filler or other fire retardant materials. Examples of useful inorganic fibres include graphite, silica, alumina-silica, calcium oxide-silica, and glass fibres. Alumino-silicate fibres are preferred and are available commercially under the trademarks Fibrefrax™ 2600 from Unifrax and Cerablanket or Kaowool™ from Morgan Advanced Materials. Preferably alkaline earth silicate (AES) fibres are used due to their bio-soluble properties. Suitable AES fibres include Isofrax™ from Unifrax and the Superwool™ range of fibres (e.g. Plus, 607 Max, HT, XTRA, Flex) available from Morgan Advanced Materials.

The amount of refractory fibre is preferably at least 30 wt % or at least 35 wt % or at least 40 wt % of the total weight of the paper. The refractory fibre provides excellent refractory and insulation properties, and when combined with binders provide good resistance to compressive forces.

The fibre diameter is usually less than about 6 µm, preferably 3 µm. Larger fibre diameters result in a material with a lower number of fibres for a given mass, yielding sheets of lower tensile strength, and are usually more difficult to handle on paper making machinery. Additionally, larger fibre diameter is associated with higher thermal conductivity of the paper. The physical properties of a preferred inorganic fibre (Superwool) are: continuous use limit at 1000° C. or at least 1100° C. or at least 1200° C.; normal packing density 64-128 kg/m$^3$; fibre lengths up to 254 mm; specific gravity about 2.65 and fibre strength of 30 to 90 KPa.

If the ceramic fibre is melt formed it may have a shot content (>45 µm) of greater than 30 wt % or even greater than 40 wt %, depending on the fibre composition. Preferably, the refractory fibre has a shot content (>45 µm) of less than 30 wt % or less than 20 wt % or less than 15 wt % or less than 10 wt %. Shot cleaning processes are typically able to lower the shot content to about 5 wt % or less, or 8 wt % or less, or 10 wt % or less shot. The shot may be cleaned via air classification or via water elutriation. Fibre length reduction is preferably minimized in the cleaning process with a substantial portion of fibre lengths (e.g. greater than 3% or greater than 5% or greater than 10%) being preferably greater than 100 mm.

Organic Fibre

The organic fiber is able to contribute towards the flexibility of the paper in addition to enabling the composite structure to entrap greater amounts of fire retardant material, such as inorganic endothermic material, as well as improving the wet strength of the paper. The organic fibres may be carbon fibres, thermoplastic fibres, cellulose or plant based fibres, protein based fibres (e.g. animal based fibres), or a combination of different fibres. Organic fibres may include, but are not limited to, aromatic polyamide, such as aramid fibres (e.g. KELVAR®) and polyacrylonitrile fibres. The organic fibres may also include wood pulp (e.g. softwood or hardwood pulp), such as *eucalyptus* hardwood pulp). The wood pulp may be Kraft pulp wood, which may also be bleached and cross-linked.

Wood fibre has been found to be particularly suitable for stabilizing particles of aluminium tri-hydrate (ATH) within the paper matrix. It is thought that the residual moisture levels in the wood fibre assist in bonding the ATH to the fibres during the paper drying step. A similar bonding effect would be expected for other metal hydroxides or hydrates used as endothermic materials.

Fire Retardant Material

The fire retardant material may be an reactive fire retardant; an inert fire retardant or a combination thereof. Reactive fire retardants function by changing chemical form or shape to absorb energy or increase their insulative properties. Reactive fire retardant materials may be an inorganic endothermic material (e.g. ATH) which retards fire through reducing the surrounding temperature or the fire retardant material may retard fire through not allowing the flames to propagate. The fire retardant particles may be selected from particles of: ammonium polyphosphate, polyphosphazene, melamine cyanurate, melamine phosphate, melamine polyphosphate, melamine poly(metal phosphates), metal oxides including aluminium hydroxide ($Al(OH)_3$), alumina trihydrate (ATH), zinc borate, and alkali metal silicates. Examples of melamine poly(metal phosphates) are melamine-poly (zinc phosphate) and melamine-poly (aluminium phosphate). A combination of different fire retardant particles may be selected.

In one embodiment, the fire retardant particles are thermally expandable or intumescent fire retardant particles that will expand when exposed to high temperature flame, for example, between 200° C. and 600° C., and preferably, they have low solubility in water and other organic liquids.

According to one embodiment, the fire retardant particles are ammonium polyphosphate particles encapsulated within a melamine or melamine-containing resin. The melamine will expand when exposed to high temperature flame, for example above 200° C.

Inert fire retardants function generally function as non-reactive refractory fillers by not propagating the fire. Examples include particles of ceramic, such as alumina or silica, pearlite, porous ceramics, clay, mica, glass, opacifiers (e.g. $TiO_2$ or $ZrO_2$).

The fire retardant particles may have a mean particle size (d50) of from 2 to 500 µm, or 5 to 100 µm, or 8 to 35 µm, and in some embodiments, 5 to 20 µm. Particle size can be determined by a laser diffraction technique, for example, using Malvern Mastersizer 2000, which operates in the 0.002 nanometer to 2000 micron range. "d50" represents the median of the particle size distribution, or alternatively is the value on the distribution such that 50% of the particles have a particle size of this value or less. For spherical or almost spherical particles the mean particle size is approximately the diameter of the particle. For intumescent fire retardant particles, the particle size is referring to that of unexpanded particles. For non-spherical particles, such as rods and flakes, the particle size refers to the average of smallest and largest dimensions.

Examples of commercially available fire retardant particles are ammonium polyphosphate particles from CLARIANT under the product names Exolit® AP 422, Exolit® AP 462 and Exolit® AP 740 F, and melamine poly(metal phosphate) commercially available under the brand name Safire from Catena Additives. Exolit® AP 422 is a fine-particle white powder having a particle size (d50) of about 15 µm. Exolit® AP 462 is a fine-particle white powder of ammonium polyphosphate micro-encapsulated (i.e., coated) with melamine resin, and having a particle size (d50) of about 20 µm. Exolit® AP 740 F is a fine-particle white powder having a size (d50) of 8-12 µm, and is based on ammonium polyphosphate which develops its effectiveness through phosphorus/nitrogen synergism and intumescence. Particles mentioned above are non-hygroscopic and non-flammable.

Other commercially available fire retardant products include Melapur MC25, MC50, MCXL, 200, 200/70, 200FF, MP. A specific example is Melapur 200 from BASF SE (Ludwigshafen, Germany), particles of melamine polyphosphate containing 42%-44% by weight of nitrogen and 12% by weight of phosphor. Examples of commercially available aluminium hydroxide and alumina trihydrate (ATH) particles are Hymod® grades and Martinal® grades from Huber Engineered Materials.

In a preferred embodiment, the fire retardant material is an inorganic endothermic material. The amount of endothermic inorganic material in the paper is preferably sufficient to counter the exothermic components of the paper (e.g. organic binder and organic fibre). The endothermic material preferably absorbs energy during degradation of the solid inorganic material into gaseous degradation product(s). The paper of the present disclosure preferably is able to emit gas which is transferred away from the affected area along with the associated heat. Preferably the amount of endothermic material is at least 25 wt % or at least 30 wt % or at least 35 wt % to achieve this objective. Too high an amount of endothermic material may result in insufficient flexibility of the paper to enable it to be readily used in mass manufacturing equipment. Too low an amount of endothermic material and the insulation and flame propagating properties of the paper may not be sufficient for the required application.

The particle size of the endothermic material is preferably sufficiently small such that the endothermic material is able to fit into the paper matrix and also form a stable slurry during the paper making process. Typical median ($d_{50}$) material size is between 2 µm and 20 µm and preferably between 4 µm and 12 µm. It will be understood that the properties of the specific endothermic materials will also dictate the appropriate particle size range.

Preferably, the paper or laminate thereof does not propagate a flame to neighboring cells.

Inorganic Binder

In some embodiments, the inorganic binder contributes significantly to the compressive resistance of the fire retardant paper. A good balance between the compressive resistance and flexibility of the paper, may be obtained by an appropriate ratio between the inorganic binder and the organic binder. Too much inorganic binder may result in a brittle product. Too little inorganic binder may result in reduced compressive strength. While there may be a degree of substitutability between the inorganic binder and the second organic binder ("hard binder"), the presence of inorganic binders may enable reduced levels of the hard binder to be used, which assists in reducing flame propagation of the paper.

The weight ratio of the organic binders to the inorganic binders is preferably in the range of from 25:1 to 5:1 and preferably in the range of from 20:1 to 10:1 or in the range of from 18:1 to 8:1. The weight ratio of the organic binders to the inorganic binders may be greater than 50:1 or greater than 100:1. In some embodiments, the fire retardant paper does not comprise any inorganic binder.

Preferably there is less than 1.5 wt % inorganic binder or less than 1.0 wt % inorganic binder or less than 0.8 wt % inorganic binder. In some embodiments, there is at least 0.1 wt % inorganic binder or at least 0.2 wt % inorganic binder or at least 0.3 wt % inorganic binder. Insufficient inorganic binder may adversely affect the compressive resistant strength of the paper for some applications. Too high an inorganic binder content may result in cracking of the paper during production, installation or use of the energy storage devices.

The inorganic binder may include, but is not limited to, clays (such as bentonite, hectorite, kaolinite, montmorillonite, palygorskite, saponite, or sepiolite), fumed silica, lithium silicate, sodium silicate, colloidal silica and the like.

Cross Linking Agents

Examples of suitable cross-linking agents include melamine formaldehyde, hydroxyethyl methacrylate methylene malonate, polyfunctional aziridenes and multifunctional carbodiimides. ZnO and MgO may also function as cross linking agents. The organic binder system may comprise up to 5 wt % cross-linking agent.

Other

There is preferably less than 20 wt %, or less than 15 wt %, or less than 10 wt %, or less than 5 wt % of other material, such as inorganic fillers; fire retardant additives or processing aids, such as flocculants (e.g. alum or a cationic polyacrylamide flocculant), wetting agents and/or dispersants.

In a preferred embodiment of the present disclosure, the paper comprises:
a. reinforcing or refractory fibre with less than 20 wt % or less than 10 wt % shot (>45 µm);
b. optionally, less than 1.0 wt % inorganic binder;
c. the weight ratio of the first organic binder to the second organic binder is greater than or in the range of from 2:1 to 10:1; and
d. the first organic binder has a glass transition temperature in the range of −20° C. to 45° C. and the second organic binder has a glass transition temperature in the range of 20° C. to 100° C.

The paper may have a thickness of between 0.1 and 10 mm or between 0.5 and 5.0 mm or between 1.0 mm and 4.0 mm.

The areal density will vary according to the exact composition of the paper, but it is typically in the range 200 to 500 kg/m³ or 220 to 450 kg/m³ or 250 to 400 kg/m³ or 300 to 350 kg/m³.

The compressive resistance of the paper (compression value) is preferably such that a reduction in the original thickness by 20% (i.e. 20% compression) requires at least a force of 0.1 MPa or at least 0.15 MPa or at least 0.20 Mpa. Preferably, a 60% compression of the paper requires no more than 5.0 MPa or no more than 4.0 MPa or no more than 3.0 MPa or no more than 2.0 MPa or no more than 1.5 MPa or no more than 1.0 MPa.

The 20% compressive resistance value is referenced as cells typically experience a level of 10% compression from each adjacent cell (so 20% total compression) under normal operating conditions, with the 60% compressive resistance value reflective of the compression by the cells on the paper towards its end of the life. The 20% and 60% compressive resistance values are an indication of the ability of the paper to maintain an appropriate compression resistance profile over their lifetime of the cells.

It will be appreciated that the upper and lower compressive resistance limits may vary depending upon the specific energy storage device configuration and application. However, in all instances, there is the requirement for a material which is able to be used in mass production which provides an appropriate compression resistance profile for the cells as well as providing mitigation of thermal runaway events.

The flexibility (at 21° C.) is preferably such that the paper may be wound around a 6 inch (152 mm) roll core without showing visual appearance (with the naked eye) of cracking.

In a second aspect of the present disclosure, there is provided a process for producing a fire retardant paper suitable for use in an energy storage device, comprising the steps of:
provising an aqueous solution comprising a mixture of reinforcing (e.g. refractory fibres) fibres, fire retardant material and a binder system comprising
i. a reactive binder; and/or
ii. a first organic binder and a second organic binder, wherein the first organic binder has a lower glass transition temperature than the second organic binder;
agitating the mixture;
forming a nonwoven wet slurry;
draining the excess solution to form a wet paper;
drying the paper; and optionally, winding the paper onto a cylindrical reel.

The mixture may optionally comprise an inorganic binder and/or an organic fibre.

In some embodiments, the reactive binder remains at least partially uncured after the drying of the wet paper. The glass transition temperature of the at least partially uncured reactive binder may be less than 25° C. or less than 20° C. or less than 15° C. or less than 12° C. or less than 10° C. or less than 5° C. or less than 0° C. With a low glass transition temperature the resultant paper will be sufficiently flexible to wind onto the cylindrical reel without cracking.

In some embodiments, the uncured reactive binder is at least partially cured after the paper is unwound from the cylindrical roll. Through curing the reactive binder, during the manufacturing process, the compression resistance of the paper may be increased to the level required for the target application. Thus, the curing of the binder system after the paper is removed from the roll enables flexibility and compression resistance of the paper to be optimised at the relevant stages of the production process.

A similar result is achieved, wherein the binder system comprises a first organic binder and a second organic binder, wherein the first organic binder has a lower glass transition temperature than the second organic binder (e.g. as defined in the first aspect of the present disclosure).

The first organic binder preferably has a glass transition temperature in the range of −10° C. to 45° C. and the second organic binder has a glass transition temperature in the range of 20° C. to 100° C.

The wet paper is preferably dried at a temperature below the activation temperature of the endothermic material. The wet paper is preferred dried such that there is no substantial activation of any heat activated cross linking agents in the binder system.

In a third aspect of the present disclosure, there is provided an energy storage device comprising the fire retardant paper according to the first aspect of the present disclosure.

In a fourth aspect of the present disclosure, there is provided a laminate or layered structure comprising the fire retardant paper according to the first or second aspect of the present disclosure. The laminate or layered structure may comprise one or more layers on one or both sides of the fire retardant paper. The laminate or layered structure may be used to improve insulation properties and/or optimize the fire retardant properties thereof.

In one embodiment the fire retardant paper is laminated or assembled next to a flame propagation resistant film, such as but not limited to polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, combinations thereof, and the like. Commercially available examples of these films are films sold by E.I. DuPont de Nemours & Co. of Wilmington, Del., such as, a polyester film sold under the trade designation MYLAR®, a polyvinylfluoride film sold under the trade designation TEDLAR®, and a polyimide film sold under the trade designation KAPTON®, and the like. The flame propagation resistant film may be metallized to minimize moisture absorption.

In some embodiments, additional ceramic or inorganic paper, such as mica paper may form part of the laminate or layer assembly. The mica paper may comprise muscovite or phlogopite, with the flexibility of the layer influenced by the binder system used.

In a fifth aspect of the present disclosure, there is provided use of the paper as in the third aspect of the present disclosure in an energy storage device comprising a plurality of cells.

The use of the paper preferably inhibits or delays a thermal runaway event propagating to a neighbouring cell through the activation of the endothermic material and/or the further thermal curing of the thermosetting (or reactive) binder.

During a thermal runaway event, the use of the paper may evolve gas from an endothermic material to remove heat from the energy storage device.

The terms fire retardant material and endothermic materials may be interchangeably used where appropriate within the specification.

For the purposes of the present disclosure the first organic binder and the second organic binder may form part of a thermoplastic elastomer with the first organic binder forming the soft phase and the second organic binder forming the hard phase. Examples of thermoplastic elastomers include polyolefin elastomers; polyester elastomers; and polyurethane elastomers.

Flexibility value for the purposes of the disclosure is the diameter of the reel which the fire retardant paper may be wound without showing visual signs of cracking with the naked eye, as described in the flexibility test.

Compression value is the compression force used to compress the thickness of the paper (nominal 2 mm thickness) by a specified % (e.g. 20% and 60%) of the original thickness as described in the compressive strength test.

DETAILED DESCRIPTION

The fire retardant paper can be prepared by combining and mixing the ingredients, such as by forming an aqueous slurry of the formulation ingredients, casting the slurry onto a paper making screen to form a paper web, and dewatering and drying the paper web into sheets or rolls using standard paper-making techniques as described, for example, in U.S. Pat. No. 3,458,329, the disclosure of which is incorporated by reference.

By way of further illustration, the fibres and binder may be combined to form a mixture or slurry. The slurry may be diluted with water to enhance formation, and it may be flocculated with a flocculating agent and drainage retention aid chemicals. Then, the flocculated mixture or slurry may be placed onto a papermaking machine to be formed into the paper. The sheets or rolls may also be formed by vacuum or tape casting the slurry or mixture with conventional equipment, and are typically dried in forced hot air ovens. Hand sheet moulds, a fourdrinier paper machine, a rotoformer paper machine, a vertical former or cylinders can be utilized to make the paper.

Example 1

Ingredients

Refractory fibre: Superwool® Max available from Thermal Ceramics Inc. The fibre has been cleaned to remove the shot levels (>45 μm) to a maximum of 10 wt % of the refractory fibre. Shot was removed using classification techniques as known in the art, with no substantial reduction in fibre length observed during the cleaning process.

Fibre B: Superwool Plus (grade 112) available from Thermal Ceramics Inc. The fibre has not been cleaned and has shot levels (>45 μm) of about 42 wt % of the refractory fibre.

Fibre C: Superwool HT available from Thermal Ceramics Inc. The fibre has not been cleaned and has shot levels (>45 μm) of about 42 wt % of the refractory fibre.

Fibre D: Evanite 706 microglass fibre available from Evanite Fiber Corporation.

Organic fibre: Bleached *Eucalyptus* Hardwood Pulp available from Fibria.

Fire Retardant: Aluminium Tri-hydrate (RJ Marshall 208ATH) with a $D_{50}$ of 8 μm.

First organic binder: Binder A (see Table 1)

Second organic binder: Binder C (see Table 1)

Inorganic binder: Megasol® S50, a colloidal silica available from Wesbond with an average particle size of 70 nm.

Inorganic binder B: Levsil FO4020 is an aqueous amorphous silica solution (30-50 wt % silica) available from AzoNobel.

Flocculant: Percol 3232L available from BASF.

In addition to the above, where indicated, the following ingredients were also used in Examples 2 to 20.

Films formed from Hycar 26138 (Binder A), Acronal S 888 S (Binder E) or Acronal 4420 (Binder B) by the evaporation of water may already be partially cross linked on drying. The degree of crosslinking can be increased by heating them to between 150-180° C.

TABLE 1

| Binder | Brand | Description | Tg (° C.) |
|---|---|---|---|
| A | Hycar 26138 | Available from Lubrizol: a heat reactive acrylic copolymer latex in an aqueous solution (about 49 wt % solids) | 25° C. |
| B | Acronal 4420 | Available from BASF: an aqueous dispersion of a heat-crosslinking copolymer of acrylic esters (about 50 wt % solids). | −11° C. |
| C | Elvanol 71-30 | Available from Kuraray: Polyvinyl alcohol aqueous dispersion, (about X w t% solids). | −80° C. |
| D | Hycar 26083 | Available from Lubrizol: A heat reactive, carboxylated acrylic copolymer latex (about 52.5 wt % solids) | −15° C. |
| E | Acronal S 888S | Available from BASF: an aqueous dispersion of heat crosslinking copolymer of acrylic esters and styrene manufactured by a process incorporating acrylonitrile (about 49 wt % solids) | 31° C. |
| F | Acronal NX 5818 | Available from BASF: an aqueous dispersion of an n-butyl acrylate-acrylonitrile-styrene copolymer (about 48 wt % solids). | 39° C. |
| G | Acronal NX 4787 | Available from BASF: aqueous copolymer dispersion of butyl acrylate and styrene (about 50 wt % solids). | 23° C. |
| H | Rhoplex 2019RX | Available from Dow Chemicals: a styrenated acrylic polymer (about 50 wt % solids). | −15° C. |
| I | Rhoplex HA8 | Available from Dow Chemicals: a self-crosslinking, acrylic emulsion (about 45.5 wt % solids). | −10° C. |
| J | Rhoplex E-358 | Available from Dow Chemicals: a self-crosslinking acrylic emulsion (about 60 wt % solids). | 8° C. |
| K | Rhoplex CS 4000 | Available from Dow Chemicals: an 100% acrylic polymer emulsion (about 48 wt % solids). | 32° C. |
| L | Rhoplex AC 337N | Available from Dow Chemicals: an 100% acrylic polymer emulsion (about 45.5 wt % solids). | 27° C. |

Fused Silica: 3M™ Fused Silica 20 with a particle size distribution with less than 3 wt % greater than 45 μm available from Ceradyne Inc.

Examples 21 to 60

The following formula was used:

| | |
|---|---|
| Water | 15 US gal. |
| Refractory fibre (Superwool® Max) | 390 g |
| Bleached Eucalyptus Hardwood Pulp | 72 g |
| Aluminium trihydrate (RJ Marshall 208ATH) | 360 g |
| Binder #1 (see Tables 1 and 3) | 132 g |
| Binder #2 (see Table 1 and 3) | 33 g |

-continued

| Inorganic binder (Megasol ® S50) | 10 g |
| Flocculant (Percol 3232L) | 7 drops |

The approximate composition of the dried composition is presented in Table 3, based upon the binders comprising 50 wt % solids.

Method

The refractory fibre was added to a vessel containing being mixed under high agitation. The refractory fibre was mixed for 5 to 10 minutes prior to adding the organic fibre at a medium to high agitation speed. The fire retardant and first and second binders were then added and mixed for at least a further 5 minutes. The inorganic binder and flocculant were then added and mixed for a further 5 minutes. The slurry was then formed into a non-woven paper sheet using traditional wet laid equipment. The wet sheet was then dried to between 120° C. to 180° C. for about 1 hour so as to initiate some of the cross-linking in the binder system, but not activate the endothermic material. After drying, the material is rolled onto a 6 inch (152 mm) core for storage and transportation. The paper had a nominal thickness of approximately 2.0 mm. It will be appreciated that the thickness of the paper may be suitably adjusted during the paper making process.

Flexibility Test

The flexibility test was based upon section 8 of ASTM F137. The samples were conditioned for at least 24 hrs @ 72° F.+/−3° F. and 70%=/−5% Relative Humidity.

The flexibility of the paper is important in ensuring that that the paper and laminates thereof are able to be used in mass production continuous operation equipment, which typically require paper and other materials to be fed into a production line from a cylindrical reel from which the paper is wound onto.

As such, the flexibility test involves a 2"×10" sheet of paper being rolled flush around a 6 inch (152 mm) cylinder. The paper is then unwound and visually inspected for cracking. If no cracking is observed with the naked eye, then the test is repeated for decreasing diameter cylinders down to the smallest diameter cylinder. The mandrel sizes used were 21.5 mm, 26.7 mm, 33.3 mm, 42.2 mm, 48.5 mm, 60.4 mm, 88.9 mm, 114 mm, and 152 mm.

The flexibility value of the paper is measured by the diameter of the cylinder prior to the diameter at which a crack was first visually detected (i.e. if crack first detected at a 33.3 mm diameter, then the flexibility value would be the preceding diameter of 42.2 mm). For samples which crack at the largest mandrel size, a flexibility value of >152 mm was given. Samples with a flexibility value of 21.5 mm (lowest measured value) may have a lower flexibility value if small mandrel diameters were used.

A flexibility measurement value is should be at or below the diameter of the reel diameter used in the manufacturing environment. The lower the flexibility value the less likely the paper will crack during the manufacturing process.

Compressive Strength Test

The paper is required to a degree of compressive strength to securely package the cells in normal operation as well as withstanding swelling of individual cells during a thermal event. As such, the paper preferably has an ability to deform slightly (e.g. 20% compression of the original thickness of the paper) under moderate force used to assemble a battery pack as well as withstanding higher forces whilst still providing a mechanical barrier between cells (e.g. 60% compression of the original thickness of the paper).

Figure 1:
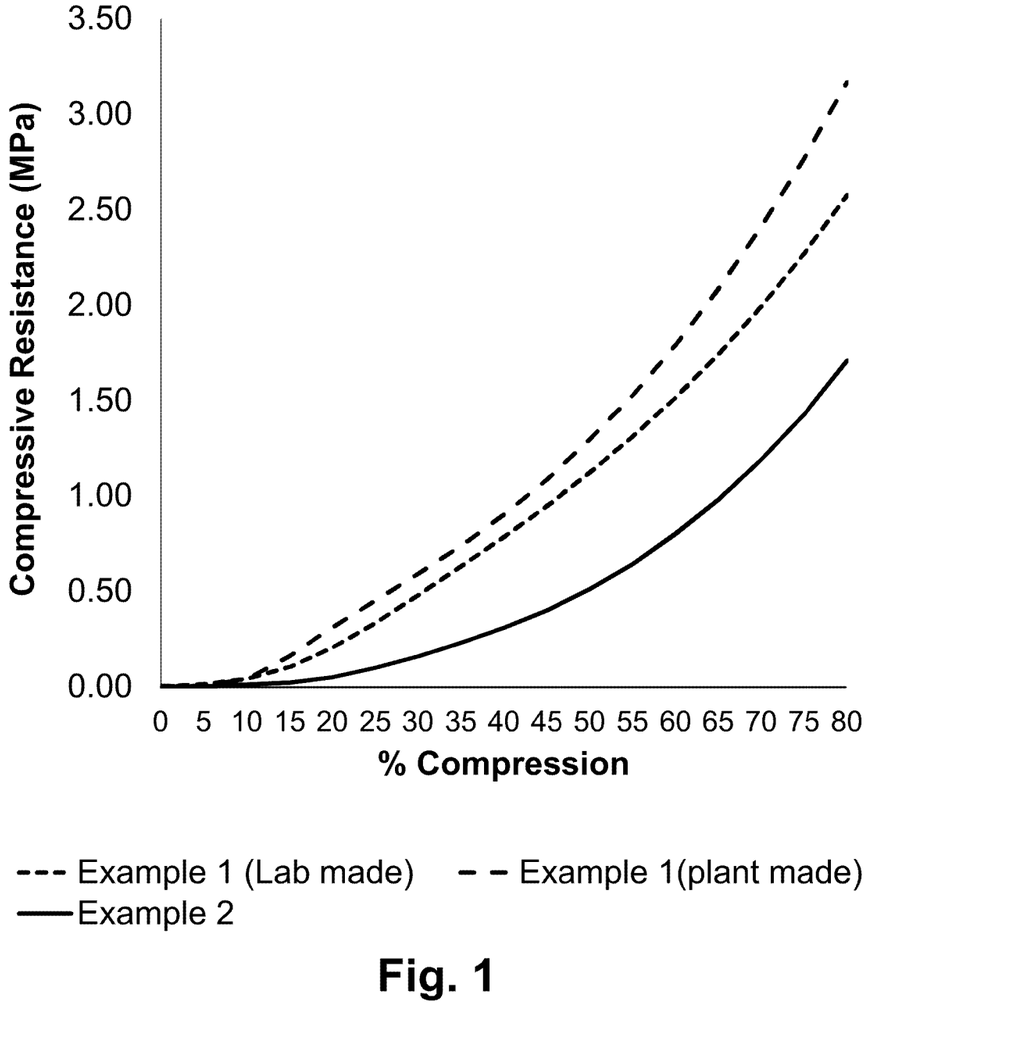
FIG. 1 is a graph of the compressive resistance (MPa) versus the % compression of an embodiment of the fire retardant paper of the present invention (Example 1) relative to a comparative example (Example 2).

FIG. 1 illustrates the compressive strength properties of Example 1 (laboratory made and pilot plant made) versus Example 2 (a comparative example with a single organic binder). The results indicate that the compressive resistance of Example 2 is significantly below that of Example 1. Further, the flexibility of Example 1 was better than Example 2, with the partial substitution of a "hard" organic binder for an inorganic binder in example 1 resulting in improved flexibility and compressive resistance.

The compression force used to compress the thickness of the paper (nominal 2 mm thickness) by up to 80% of the original thickness was performed using a Tinius Olsen test unit with a load cell capable of handling 10 KN force. The results of the compression force (compression value) required to obtain 20%, 60% and selective 50% compression are provided in Tables 2 & 3.

The results from Table 2 illustrate that paper with relatively high amounts of inorganic binder or with high shot levels (e.g. >10 wt %) generally do not have sufficient flexibility to be used for mass production techniques requiring continuous feeding of the paper from a reel.

A comparison of Examples 11 to 14 highlights the detrimental effect of having elevated shot levels with the compressive strength significantly decreasing in the samples containing uncleaned refractory fibres (Examples 11 & 13). It is thought that the presence of shot particles reducing the effective bridging of the binders with the fibrous material, thereby reducing the ability of the paper to absorb compressive forces.

The comparison of Examples 1 & 7 demonstrates how relatively small changes in organic binder content can significantly affect the compressive strength properties of the paper.

TABLE 2

| Example | Refractory Fibre | Organic Fibre | Fire Retardant | Inorganic Binder | Organic Binder #1 | Organic Binder #2 | Flex test | 20% Compression Mpa | 60% (50%) Compression Mpa | Binder O/I | B1/B2 |
| --- | --- | --- | --- | --- | --- | --- | --- | --- | --- | --- | --- |
| 1 | 42.78 | 7.91 | 39.54 | 0.55 | 7.40 | 1.82 | 88.9 | 0.20/0.31 | 1.52/1.74 | 16.8 | 4.1 |
| 2 | 42.11 | 7.97 | 39.86 | 1.79 | 9.15 | — | 152 | 0.05 | 0.80 (0.51) | 5.1 | — |
| 3 | 41.23 | 7.98 | 39.88 | 3.45 | 7.46 | — | >152 | 0.25 | 1.45 | 2.2 | — |
| 4 | 41.22 | 7.97 | 39.86 | 1.66 | 7.46 | 1.83 | 33.3 | 0.30 | 1.57 | 5.6 | 4.1 |
| 5 | 41.22 | 7.97 | 39.86 | 1.66 | 7.46 B | 1.83 | 88.9 | 0.15 | 1.02 | 5.6 | 4.1 |
| 6 | 42.79 | 7.91 | 39.56 | 1.78 | 7.40 | 0.56 | 152 | 0.13 | 1.21 | 4.5 | 1.3 |
| 7 | 41.26 | 7.98 | 39.90 | 0.55 | 8.47 | 1.83 | 114 | 0.12 | 1.12 | 18.7 | 4.6 |
| 8 | 42.36 B | 7.83 | 39.16 | 0.54 | 8.31 | 1.80 | >152 | 0.14 | 1.20 | 18.7 | 4.6 |
| 9 | 42.37 B | 7.83 | 39.17 | 1.76 | 8.31 | 1.76 | >152 | 0.12 | 1.13 (0.78) | 5.7 | 4.7 |
| 10 | 41.26 B | 7.98 | 39.90 | 0.55 | 8.47 | 1.83 | >152 | 0.25 | 1.54 | 18.7 | 4.6 |
| 11 | 42.38 B | 5.68 | 40.99 | 1.71 | 7.36 | 1.88 | >152 | 0.18 | 1.38 | 5.4 | 3.9 |
| 12 | 42.38 | 5.68 | 40.99 | 1.71 | 7.36 | 1.88 | >152 | 0.28 | 1.78 | 5.4 | 3.9 |

TABLE 2-continued

| Example | Refractory Fibre | Organic Fibre | Fire Retardant | Inorganic Binder | Organic Binder #1 | Organic Binder #2 | Flex test | 20% Compression Mpa | 60% (50%) Compression Mpa | Binder O/I | B1/B2 |
|---|---|---|---|---|---|---|---|---|---|---|---|
| 13 | 42.38 B | 5.68 | 40.99 | 1.71 | 7.36 | 1.88 | 152 | 0.09 | 0.97 | 5.4 | 3.9 |
| 14 | 42.38 | 5.68 | 40.99 | 1.71 B | 7.36 | 1.88 | >152 | 0.20 | 1.41 | 5.4 | 3.9 |
| 15 | 42.01 B | 4.17 | 40.63 | 1.69 | 8.62 | 2.87 | 114 | 0.13 | 1.24 | 6.8 | 3.0 |
| 16 | 34.56 C 5.40 D | 3.24 | 21.60# | 2.70 | 2.75 B | 2.75 | 114 | 0.08 | — (0.52) | 2.0 | 1.0 |
| 17 | 34.56 B 5.40 D | 3.24 | 21.60# | 2.70 | 2.75 B | 2.75 | 152 | 0.08 | — (0.55) | 2.0 | 1.0 |
| 18 | 37.79 B 3.24 D | 2.16 | 21.59# | 1.62 | 3.85 B | 2.75 | 152 | 0.08 | — (0.50) | 4.1 | 1.4 |
| 19 | 41.09 | 6.32 | 37.98 | 0.54 | 5.27 | 3.42 + 5.37 C | 48.5 | 0.06 | — (0.56) | 26.0 | 0.6 |
| 20 | 43.19 | 6.64 | 39.92 | 0.54 | 5.65 | 1.83 + 2.21 C | 88.9 | 0.13 | — (0.78) | 17.9 | 1.4 |
| 21-60 | 39.0 | 7.2 | 36.0 | 1.0 | 13.2 | 3.3 | | | See Table 3 | | | further contains 27 wt % fused silica
O/I signifies the weight ratio of the organic binder to the inorganic binder
B1/B2 signifies the weight ratio of the organic binder #1 to the organic binder #2
Unless indicated otherwise (e.g. 37.79 B), the ingredients used are those used in Example 1.
The compression value for example 1 relate to a laboratory made and a plant trial made formula respectively.

TABLE 3

| Example | binder #2 | Tg(2) °C. | binder #1 | Tg(1) °C. | Tg(2) − Tg(1) °C. | Wt Mean $T_g$ °C. | Flexibility mm | 20% compression MPa | 60% compression MPa |
|---|---|---|---|---|---|---|---|---|---|
| 21 | F | 39 | G | 23 | 16 | 26.2 | 48.5 | 0.159 | 1.724 |
| 22 | F | 39 | B | 11* | 28 | 16.6 | 33.3 | 0.113 | 1.223 |
| 23 | F | 39 | H | −15 | 54 | −4.2 | 26.7 | 0.147 | 1.887 |
| 24 | F | 39 | I | −10* | 49 | −0.2 | 26.7 | 0.182 | 1.962 |
| 25 | F | 39 | J | 8* | 31 | 14.2 | 26.7 | 0.100 | 1.283 |
| 26 | F | 39 | D | −15* | 54 | −4.2 | 21.5 | 0.195 | 1.823 |
| 27 | F | 39 | A | 25* | 14 | 27.8 | 88.9 | 0.153 | 1.535 |
| 28 | G | 23 | B | 11* | 12 | 13.4 | 21.5 | 0.136 | 1.801 |
| 29 | G | 23 | H | −15 | 38 | −7.4 | 21.5 | 0.120 | 1.341 |
| 30 | G | 23 | I | −10* | 33 | −3.4 | 21.5 | 0.127 | 1.587 |
| 31 | G | 23 | J | 8* | 15 | 11 | 21.5 | 0.137 | 1.359 |
| 32 | G | 23 | D | −15* | 38 | −7.4 | 21.5 | 0.122 | 1.563 |
| 33** | A | 25* | G | 23 | 2 | 24.6 | 60.4 | 0.102 | 1.196 |
| 34 | K | 32 | G | 23 | 9 | 24.8 | 60.4 | 0.091 | 1.195 |
| 35 | K | 32 | B | 11* | 21 | 15.2 | 26.7 | 0.082 | 1.241 |
| 36 | K | 32 | H | −15 | 47 | −5.6 | 21.5 | 0.165 | 1.493 |
| 37 | K | 32 | I | −10* | 42 | −1.6 | 21.5 | 0.138 | 1.370 |
| 38 | K | 32 | J | 8* | 24 | 12.8 | 21.5 | 0.095 | 1.150 |
| 39 | K | 32 | I | −15* | 47 | −5.6 | 26.7 | 0.150 | 1.551 |
| 40 | K | 32 | A | 25* | 7 | 26.4 | 88.9 | 0.108 | 1.345 |

| Example | binder #2 | Tg(2) °C. | binder #1 | Tg(1) °C. | Tg(2) − Tg(1) °C. | Wt Mean Tg °C. | Flexibility mm | 20% compression MPa | 60% compression MPa |
|---|---|---|---|---|---|---|---|---|---|
| 41 | L | 27 | G | 23 | 4 | 23.8 | 42.2 | 0.103 | 0.954 |
| 42 | L | 27 | B | 11* | 16 | 14.2 | 26.7 | 0.137 | 1.424 |
| 43 | L | 27 | H | −15 | 42 | −6.6 | 26.7 | 0.158 | 1.575 |
| 44 | L | 27 | I | −10* | 37 | −2.6 | 21.5 | 0.148 | 1.488 |
| 45 | L | 27 | J | 8* | 19 | 11.8 | 21.5 | 0.191 | 1.750 |
| 46 | L | 27 | D | −15* | 42 | −6.6 | 26.7 | 0.128 | 1.255 |
| 47 | L | 27 | A | 25* | 2 | 25.4 | 60.4 | 0.266 | 2.056 |
| 48 | E | 31* | G | 23 | 8 | 24.6 | 60.4 | 0.231 | 2.140 |
| 49a | E | 31* | B | 11* | 20 | 15 | 33.3 | 0.164 | 1.688 |
| 49b | E | 31* | B | 11* | 20 | 15 | 152 | 0.504 | 3.614 |
| 50 | E | 31* | H | −15 | 46 | −5.8 | 33.3 | 0.136 | 1.739 |
| 51 | E | 31* | I | −10* | 41 | −1.8 | 26.7 | 0.128 | 1.139 |
| 52 | E | 31* | J | 8* | 23 | 12.6 | 26.7 | 0.093 | 1.340 |
| 53 | E | 31* | D | −15* | 46 | −5.8 | 21.5 | 0.136 | 1.437 |
| 54 | C | 80 | G | 23 | 57 | 34.4 | 114 | 0.148 | 1.797 |
| 55 | C | 80 | B | 11* | 69 | 24.8 | 114 | 0.151 | 2.452 |
| 56 | C | 80 | H | −15 | 95 | 4 | 21.5 | 0.176 | 2.072 |
| 57 | C | 80 | I | −10* | 90 | 8 | 21.5 | 0.116 | 1.683 |
| 58 | C | 80 | J | 8* | 72 | 22.4 | 21.5 | 0.093 | 1.185 |

TABLE 3-continued

| 59 | C | 80 | D | −15* | 95 | 4  | 21.5 | 0.120 | 1.431 |
|----|---|----|---|------|----|----|------|-------|-------|
| 60 | C | 80 | A | 25*  | 55 | 25 | 114  | 0.180 | 2.685 |

*contains a heat activated cross-linking agent
**132 g binder #2 and 33 g of binder #1

Examples 2 & 3 highlight the difficulties in obtaining both good compressive strength and the required flexibility through the use of a single organic binder. With Example 1, 7 and 20 illustrating that the use of two or more binders is able to deliver the required properties for the fire retardant paper. While the 60% compression test was not performed for Example 20, it may be deduced from the 50% compression results that Example 20 would have had a similar 60% compression result to that of Example 9.

It will be appreciated that the level of flexibility may also be increased through lowering the amount or type of fire retardant material.

The flexibility and compressive strength test were performed at approximately 21° C.

Thermal Performance

The fire retardant paper has the function to prevent thermal runaway between neighbouring cells and, as such, it is important that the temperature of the paper furthest away from the thermal event (i.e. the cold face) is kept as low as possible and below a temperature which is likely to result in the thermal event extending to the neighbouring cell.

Figure 2:
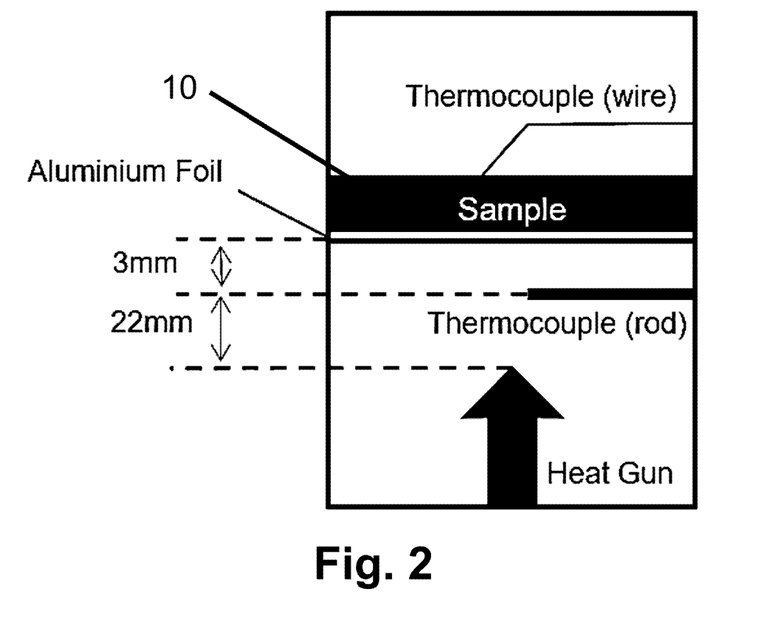
FIG. 2 is a schematic diagram of the apparatus setup for the thermal performance test.

The paper produced in accordance to Example 1 (2.0 mm thick) was tested by placing a sample in an insulated chamber according to the configuration illustrated in FIG. 2. The heat gun was set at a temperature of 500° C. for 10 minutes, with the temperature of the cold face 10 recorded over time, with the results provided in FIG. 3.

Figure 3:
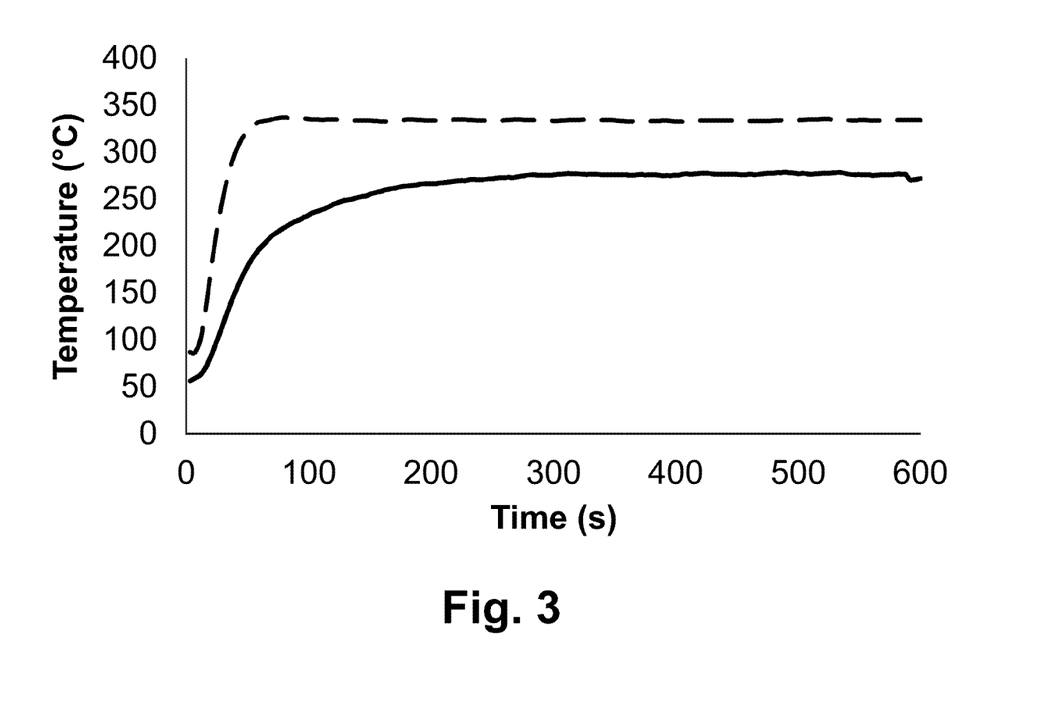
FIG. 3 is a graphic representation of the results of the thermal performance test.

The performance of Example 1 was compared to a 2.0 mm paper comprising 93.6 wt % Superwool® Plus and 5.0 wt % Arconal 420 S (Tg: −6° C.) and 1.4 wt % Arconal S 888S (Tg: 31° C.). As illustrated in FIG. 3, the paper of the present disclosure has is able to maintain a lower cold face through a combination of the insulation and endothermic properties of the paper.

Effect of Binder

Examples 21 to 60 were designed to assess the impact of different combination of polymeric binders. All other components of the of the paper were kept the same, with the binder components varied. Example 49b is Example 49a held at 180° C. for 1 hour to activate the in-situ cross-linking agent.

The following observations were made:
Improved flexibility was obtained when second (softer) binder had a lower $T_g$, with the maximum flexibility achieved with a $T_g$ of 11° C. or lower (e.g. Examples 26, 28-32, 37, 38, 44, 45, 56-59).
While increased flexibility generally correlated with a lower weight mean glass transition temperature of the binder system, as indicated in Example 58, having a minor proportion of a softer binder (e.g. $T_g$ below 11° C. or lower) is sufficient to maintain good flexibility in the paper.
The drying of the paper does not appear to have resulted in significant cross-linking of the heat activated polymers, with binders D and H behaving similarly, despite binder D comprising a heat activated cross-linking agent.
The activation of cross-linking of the binder system has the ability to significantly increase the compression resistance of the paper, whilst decreasing paper flexibility ((Examples 49a & 49b). The skilled artisan would be able to take the teachings of Examples 49a & 49b to produce a fire retardant paper under the second aspect of the present disclosure.

Applications

While the paper is particularly advantageous when used as spacers between pouch cells, the fire retardant paper may find applications outside of those in energy storage devices. For example, the fire retardant paper may be used to protect electronics and cabling from fire and/or be used in compact spaces such as the aerospace, automobile or shipping industry. The paper may also be used in heat shield applications.

Reference throughout this specification to "one embodiment," "certain embodiments," "various embodiments," "one or more embodiments" or "an embodiment" and the like means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" and the like in various places throughout this specification are not necessarily referring to the same embodiment of the disclosure. Furthermore, the particular features, structures, materials, or characteristics may be combined in any suitable manner in one or more embodiments. When used in this specification and claims, the terms "comprises" and "comprising" and variations thereof mean that the specified features, steps or integers are included. The terms are not to be interpreted to exclude the presence of other features, steps or components.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

The invention claimed is:

1. A fire retardant paper comprising:
(A) 30 wt % to 65 wt % refractory fibre;
(B) 0 wt % to 30 wt % organic fibre;
(C) 5.0 wt % to 65 wt % fire retardant material;
(D) 3.0 wt % to less than 20 wt % organic binder, the organic binder comprising a first organic binder and a second organic binder; and
(E) >0 wt % to 4 wt % inorganic binder selected from the group consisting of: fumed silica, lithium silicate, sodium silicate, and colloidal silica;
wherein a total of A+B+C+D+E is >80 wt %, a binder system comprises the organic binder and the inorganic binder, and, the first organic binder has a lower glass transition temperature than the second organic binder, the first organic binder has a glass transition temperature in the range of −100° C. to 45° C. and the second organic binder has a glass transition temperature in the range of 20° C. to 100° C., and the weight ratio of the first organic binder to the second organic binder is in the range of 0.5:1 to 20:1, the fire retardant paper having a flexibility value of less than 152 mm and a 20% compression value of at least 0.09 Mpa and a 60% compression value of at least 0.9 MPa.

2. The fire retardant paper according to claim 1, wherein the inorganic binder content is at least 0.1 wt %.

3. The fire retardant paper according to claim 2, wherein the inorganic binder content is at least 0.3 wt %.

4. The fire retardant paper according to claim 1, wherein the refractory fibre has a continuous use temperature of greater than or equal to 1000° C.

5. The fire retardant paper of claim 1, wherein the organic binder content is 5.0 wt % to 15 wt %.

6. The fire retardant paper according to claim 1, wherein a difference between the glass transition temperature of the second and first organic binders ($Tg_2-Tg_1$) is greater than 10° C.

7. The fire retardant paper according to claim 1, comprising less than 2.0 wt % inorganic binder.

8. The fire retardant paper according to claim 1, comprising:
(A) 30 wt % to 50 wt % of the refractory fibre;
(B) 0 wt % to 15 wt % of the organic fibre;
(C) 20 wt % to 60 wt % of the fire retardant material;
(D) 5.0 wt % to 15 wt % of the organic binder; and
(E) >0 to 2.0 wt % of the inorganic binder.

9. The fire retardant paper according to claim 1 comprising at least 2 wt % organic fibre.

10. The fire retardant paper according to claim 1, wherein the refractory fibre comprises less than 20 wt % shot (>45 μm).

11. The fire retardant paper according to claim 1, wherein a weight ratio of the first organic binder to the second organic binder is in a range of from 1:1 to 10:1.

12. The fire retardant paper according to claim 1 comprising:
(i.) refractory fibre with less than 20 wt % shot (>45 μm);
(ii.) less than 1.0 wt % inorganic binder;
(iii.) the weight ratio of the first organic binder to the second organic binder is in a range of from 2:1 to 10:1; and
(iv.) the first organic binder has a glass transition temperature in the range of −20° C. to 45° C. and the second organic binder has a glass transition temperature in a range of 20° C. to 100° C.

13. The fire retardant paper according to claim 1, wherein a weight ratio of the first organic binder to the second organic binder is greater than 2:1.

14. The fire retardant paper according to claim 1, wherein at least one of the first organic binder and/or the second organic binder is a heat reactive binder, wherein the fire retardant material comprises an endothermic material, and wherein the heat reactive binder cross links below an activation temperature of the endothermic material.

15. A fire retardant paper comprising:
(A) 30 wt % to 65 wt % refractory fibre;
(B) 0 wt % to 30 wt % organic fibre;
(C) 5.0 wt % to 65 wt % fire retardant material;
(D) 3.0 wt % to less than 20 wt % organic binder, the organic binder comprising a first organic binder and a second organic binder;
(E) >0 wt % to 4 wt % inorganic binder; and
(F) between 0.5 to 5 wt % of a reactive binder relative to a total weight of the organic binder,
wherein a total of A+B+C+D+E is >80 wt %, a binder system comprises the organic binder and the inorganic binder, and, the first organic binder has a lower glass transition temperature than the second organic binder, the first organic binder has a glass transition temperature in the range of −100° C. to 45° C. and the second organic binder has a glass transition temperature in the range of 20° C. to 100° C., and the weight ratio of the first organic binder to the second organic binder is in the range of 0.5:1 to 20:1, and wherein the fire retardant material comprises an endothermic material, and wherein the reactive binder has a curing temperature within 20° C. of an activation temperature of the endothermic material.

16. A fire retardant paper comprising:
(A) 30 wt % to 65 wt % refractory fibre;
(B) 0 wt % to 30 wt % organic fibre;
(C) 5.0 wt % to 65 wt % fire retardant material;
(D) 3.0 wt % to less than 20 wt % organic binder, the organic binder comprising a first organic binder and a second organic binder; and
(E) >0 wt % to 4 wt % inorganic binder selected from the group consisting of a clay, bentonite, hectorite, kaolinite, montmorillonite, palygorskite, saponite, and sepiolite;
wherein a total of A+B+C+D+E is >80 wt %, a binder system comprises the organic binder and the inorganic binder, and, the first organic binder has a lower glass transition temperature than the second organic binder, the first organic binder has a glass transition temperature in the range of −100° C. to 45° C. and the second organic binder has a glass transition temperature in the range of 20° C. to 100° C., and the weight ratio of the first organic binder to the second organic binder is in the range of 0.5:1 to 20:1, the fire retardant paper having a flexibility value of less than 152 mm and a 20% compression value of at least 0.09 Mpa and a 60% compression value of at least 0.9 MPa.

17. The fire retardant paper according to claim 16, comprising less than 2.0 wt % inorganic binder.

18. The fire retardant paper according to claim 16, wherein the inorganic binder content is at least 0.1 wt %.

19. The fire retardant paper according to claim 18, wherein the inorganic binder content is at least 0.3 wt %.

* * * * *